(12) United States Patent
Ueno et al.

(10) Patent No.: US 7,707,983 B2
(45) Date of Patent: May 4, 2010

(54) ROLLING BEARING, CAM SHAFT ASSEMBLY AND CAM SHAFT SUPPORTING APPARATUS

(75) Inventors: Hiroshi Ueno, Tondabayashi (JP); Kazuyoshi Yamakawa, Nishinomiya (JP); Tomoya Hattori, Kashiba (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 147 days.

(21) Appl. No.: 11/885,149

(22) PCT Filed: Mar. 8, 2006

(86) PCT No.: PCT/JP2006/304486

§ 371 (c)(1),
(2), (4) Date: Aug. 27, 2007

(87) PCT Pub. No.: WO2006/095777

PCT Pub. Date: Sep. 14, 2006

(65) Prior Publication Data

US 2008/0170816 A1 Jul. 17, 2008

(30) Foreign Application Priority Data

Mar. 11, 2005 (JP) ............................ 2005-068864
Mar. 11, 2005 (JP) ............................ 2005-068866

(51) Int. Cl.
*F01L 1/04* (2006.01)
(52) U.S. Cl. .................. 123/90.6; 123/90.31; 29/888.1; 384/577
(58) Field of Classification Search ............... 123/90.27, 123/90.31, 90.44, 90.6; 29/888.1; 384/568, 384/572, 577
See application file for complete search history.

(56) References Cited

U.S. PATENT DOCUMENTS

| 5,181,485 A | * | 1/1993 | Hirose et al. ............. 123/90.17 |
| RE36,804 E | * | 8/2000 | Kajihara et al. ............. 384/480 |
| 6,591,713 B2 | * | 7/2003 | Jesel ........................... 74/567 |

FOREIGN PATENT DOCUMENTS

| JP | 57-20504 U | 2/1982 |
| JP | 59-49706 U | 4/1984 |
| JP | 59-62270 U | 4/1984 |
| JP | 61-116123 A | 6/1986 |
| JP | 3-160117 A | 7/1991 |
| JP | 4-12102 A | 1/1992 |
| JP | 5-6104 U | 1/1993 |
| JP | 6-8704 A | 2/1994 |
| JP | 06-16721 U | 3/1994 |
| JP | 6-235425 A | 8/1994 |
| JP | 7-34838 A | 2/1995 |
| JP | 8-35408 A | 2/1996 |
| JP | 08074534 A * | 3/1996 |
| JP | 8-218817 A | 8/1996 |
| JP | 2002-515105 A | 5/2002 |
| JP | 2003-176830 A | 6/2003 |
| WO | WO 9424446 A1 * | 10/1994 |

* cited by examiner

*Primary Examiner*—Ching Chang
(74) *Attorney, Agent, or Firm*—Birch, Stewart, Kolasch & Birch, LLP (57) ABSTRACT

A cam shaft assembly is provided which includes a rolling bearing providing for effective oil feeding to a raceway. The assembly includes: a shaft 1; the rolling bearings 3 rotatably supporting the shaft 1; and cams 2 fitted on the shaft 1. The rolling bearing 3 includes a circumferential groove formed on an outer periphery of an outer ring 5 and an axial groove extending from place in the circumferential groove and opening on a lateral side of the outer ring 5.

4 Claims, 11 Drawing Sheets

ROLLING BEARING, CAM SHAFT ASSEMBLY AND CAM SHAFT SUPPORTING APPARATUS

TECHNICAL FIELD

The present invention relates to a rolling bearing, a cam shaft assembly using the same, and a cam shaft supporting apparatus supporting a cam shaft for operatively opening/closing intake/exhaust valves of an engine.

BACKGROUND ART

An engine for use in vehicles such as an automotive vehicle includes a cam shaft for operatively opening/closing intake/exhaust valves. The cam shaft is a shaft body having a plurality of cams arranged in an axial direction thereof and is disposed in a valve operating chamber enclosed by a cylinder head and a head cover of an engine. The cam shaft is supported rotatably relative to the cylinder head by means of a cam shaft supporting apparatus including a plurality of sliding bearings axially arranged with regular spacing.

However, the sliding bearing of the cam shaft supporting apparatus may sometimes have a relatively great frictional resistance in a state where an engine speed is low, so as to be increased in rotary torque. The sliding bearing constitutes one causative factor to decrease the mileage performance of the engine. In this connection, Japanese Unexamined Utility Model Publication No. H6(1994)-8704 and Japanese Unexamined Patent Publication No. H4(1992)-12102 have disclosed structures wherein the cam shaft is supported by rolling bearings in order to improve the mileage performance of the engine. In this manner, the approaches have been made to decrease the frictional resistance for decreasing the rotary torque.

The conventional structures for rotatably supporting the cam shaft in the cylinder head include one wherein the sliding bearing is used as set forth in Japanese Unexamined Patent Publication No. H8(1996)-218817 and one wherein the rolling bearing is used as set forth in Japanese Unexamined Utility Model Publication No. H5(1993)-6104. In the case where the sliding bearing is used, a lubricant is fed to an outer periphery of the sliding bearing via an oil feeding hole formed at the cylinder head and then is delivered to space between an outer periphery of the shaft and an inner periphery (journal surface) of the sliding bearing via a radial through-hole formed in the sliding bearing. However, the sliding bearing so lubricated has a greater frictional resistance with respect to the shaft as compared with the case where the rolling bearing is used. It is therefore more favorable to use the rolling bearing in the light of achieving a greater reduction of the frictional resistance.

DISCLOSURE OF THE INVENTION

The rolling bearing of the above conventional cam shaft supporting apparatus is lubricated with the lubricant circulating through the engine. The lubricant circulating through the engine contains foreign substances including carbon sludge produced by a combustion gas, metal wear particles resulting from metal-to-metal friction in the engine, and the like. If the rolling bearing is lubricated with the lubricant containing such foreign substances, the foreign substances invade into the above rolling bearing, thus inducing a problem that vibrations and noises are produced or abnormal wear occurs so as to decrease the service life of the cam shaft supporting apparatus.

In the case where the rolling bearing is employed for reducing the frictional resistance between the bearing and the cam shaft, it is difficult to feed the oil from the cylinder head side to raceways of the rolling bearing. In the case of the sliding bearing, the oil feeding hole formed in an inner periphery of the sliding bearing induces no problem in terms of performance. In the case of the rolling bearing having the oil feeding hole opened on the raceway thereof, however, the rolling element rolls over the oil feeding hole, thus causing vibrations and noises and decreasing the service life of the bearing.

In view of the foregoing, the invention has an object to provide a cam shaft supporting apparatus which is adapted to prevent the production of vibrations and noises and the decrease of the service life, even if the rolling bearing is employed for achieving torque reduction. It is another object of the invention to provide a rolling bearing capable of feeding oil to the raceway without affecting the rolling motion of the rolling element as well as to provide a cam shaft assembly using the same.

According to the invention for achieving the above object, a rolling bearing comprises: a groove formed on an outer periphery of an outer ring; and an oil feeding hole formed at place in the groove and extended therefrom through the outer ring to a surface portion of an inner periphery of the outer ring, the surface portion located out of contact with a rolling element.

According to this constitution, the lubricant fed into the groove formed on the outer periphery of the outer ring may be delivered to the inner periphery of the outer ring via the oil feeding hole extended through the outer ring. The oil feeding hole opens on the surface portion located out of contact with the rolling element so that the oil feeding hole does not affect the rolling motion of the rolling element. While the lubricant is delivered to the surface portion located out of contact with the rolling element, or to the portion other than the raceway, the lubricant flows along the inner periphery of the outer ring toward the raceway so that the oil feeding to the raceway may be accomplished.

A rolling bearing according to the invention comprises: a circumferential groove formed on an outer periphery of an outer ring; and an axial groove formed on the outer periphery of the outer ring and extended from place in the circumferential groove and opening on a lateral side of the outer ring.

According to this constitution, the lubricant fed into the circumferential groove formed on the outer periphery of the outer ring may be delivered to the lateral side of the outer ring via the axial groove. The lubricant delivered to the lateral side of the outer ring flows along the lateral side and the inner periphery thereof so that the oil feeding to the raceway may be accomplished.

It is preferred that the circumferential groove is formed axially centrally on the outer periphery of the outer ring, whereas the axial grooves are formed on axially opposite sides of the circumferential groove in a manner to linearly extend through the outer ring and to interconnect the opposite lateral sides thereof. This permits the lubricant to be uniformly delivered to the axially opposite sides of the rolling bearing. This constitution is effective in a case where the opposite lateral sides of the rolling bearing are under the same conditions (such as configurations of peripheral members).

It is also preferred that the circumferential groove is formed axially centrally on the outer periphery of the outer ring, whereas the axial grooves are formed on axially opposite sides of the circumferential groove as circumferentially shifted from each other. This constitution is effective in a case where the opposite lateral sides of the rolling bearing are under different conditions so that the ease of flow of the lubricant differs between the right-hand and left-hand portions of the bearing.

It is also preferred that the axial groove is formed on the outer periphery of the outer ring in a manner to incline relative to a straight line parallel to a center axis of the outer periphery of the outer ring. This constitution permits the lubricant fed into the circumferential groove to flow to the lateral side of the outer ring smoothly.

A cam shaft assembly according to the invention comprises: the above rolling bearing; a shaft rotatably supported by the rolling bearing; and a cam independent from the shaft and including a through-hole so as to be fitted on the shaft, the rolling bearing including an annular monolithic race and fitted on the shaft.

This constitution employs the rolling bearing for supporting the shaft so that the frictional resistance of the bearing may be decreased for reducing friction loss during rotation. The constitution is particularly effective at reducing the frictional resistance at the start of rotation and during low speed rotation. Since the cam is independent from the shaft, an end of the shaft may be inserted through the rolling bearing the cam is mounted to the shaft and then, the rolling bearing may be moved to a predetermined position and mounted thereto. Therefore, the rolling bearing need not have the raceway formed in a split structure so that seam formation on the raceway is obviated. If the raceway is formed in the split structure so as to be formed with the seam thereon, the rolling element moving over the seam produces the vibrations and noises, decreasing the service life of the bearing. In addition, the end of the shaft may be inserted through the cam so that the cam may be moved from the end of the shaft to be mounted to a predetermined position.

A cam shaft supporting apparatus according to the invention comprises: a plurality of rolling bearings disposed in a valve operating chamber enclosed by a cylinder head and a head cover of an engine, rotatably supporting a cam shaft relative to the cylinder head, and having a grease sealed therein; and shielding means for shielding the plural rolling bearings against an invading engine lubricant.

The cam shaft supporting apparatus constituted as described above includes the shielding means so as to be able to prevent the engine lubricant from invading into the pair of rolling bearings. Thus, the apparatus is capable of assuredly lubricating these rolling bearings with the grease sealed therein while preventing the foreign substances, such as carbon sludge and metal particles contained in the engine lubricant, from invading into the rolling bearings.

It is preferred in the above cam shaft supporting apparatus that the plural rolling bearings support only the opposite ends of the cam shaft.

In this case, the constitutions of the cylinder head and the like on the periphery of the cam shaft may be simplified as compared with a case where the cam shaft is supported by a larger number of bearings. Further, the cam shaft is not supported by any other bearing than these rolling bearings and hence, the rotary torque of the cam shaft may be reduced further as compared with the case where the cam shaft is supported by a larger number of bearings.

It is preferred in the above cam shaft supporting apparatus that the shielding means comprises shielding plates formed leastwise at one of the cylinder head and the head cover, and partitioning the valve operating chamber thereby shielding against the invading engine lubricant and defining bearing chambers in the valve operating chamber, the bearing chambers in which the plural bearings are disposed.

In this case, at least one of the cylinder head and the cylinder cover is provided with the shielding plates so that the plural rolling bearings may be easily shielded against the invading engine lubricant without especially assembling an additional member for shielding the lubricant.

A cam shaft supporting apparatus according to the invention comprises a pair of rolling bearings disposed externally of a valve operating chamber enclosed by a cylinder head and a head cover of an engine, and rotatably supporting a cam shaft relative to the cylinder head as mounted to opposite ends of the cam shaft extending through the valve operating chamber and projecting the opposite ends thereof from the cylinder head or the head cover.

According to the cam shaft supporting apparatus constituted as described above, the pair of rolling bearings do not suffer the invasion of the engine lubricant therein because the bearings are disposed externally of the valve operating chamber. Thus, the apparatus is capable of preventing the foreign substances contained in the engine lubricant from invading into these rolling bearings.

It is preferred in the above cam shaft supporting apparatus that at least one of the rolling bearing pair is a ball bearing.

In this case, the apparatus is capable of bearing an axial load exerted on the cam shaft by means of the ball bearing.

BEST MODES FOR CARRYING OUT THE INVENTION

Figure 1:
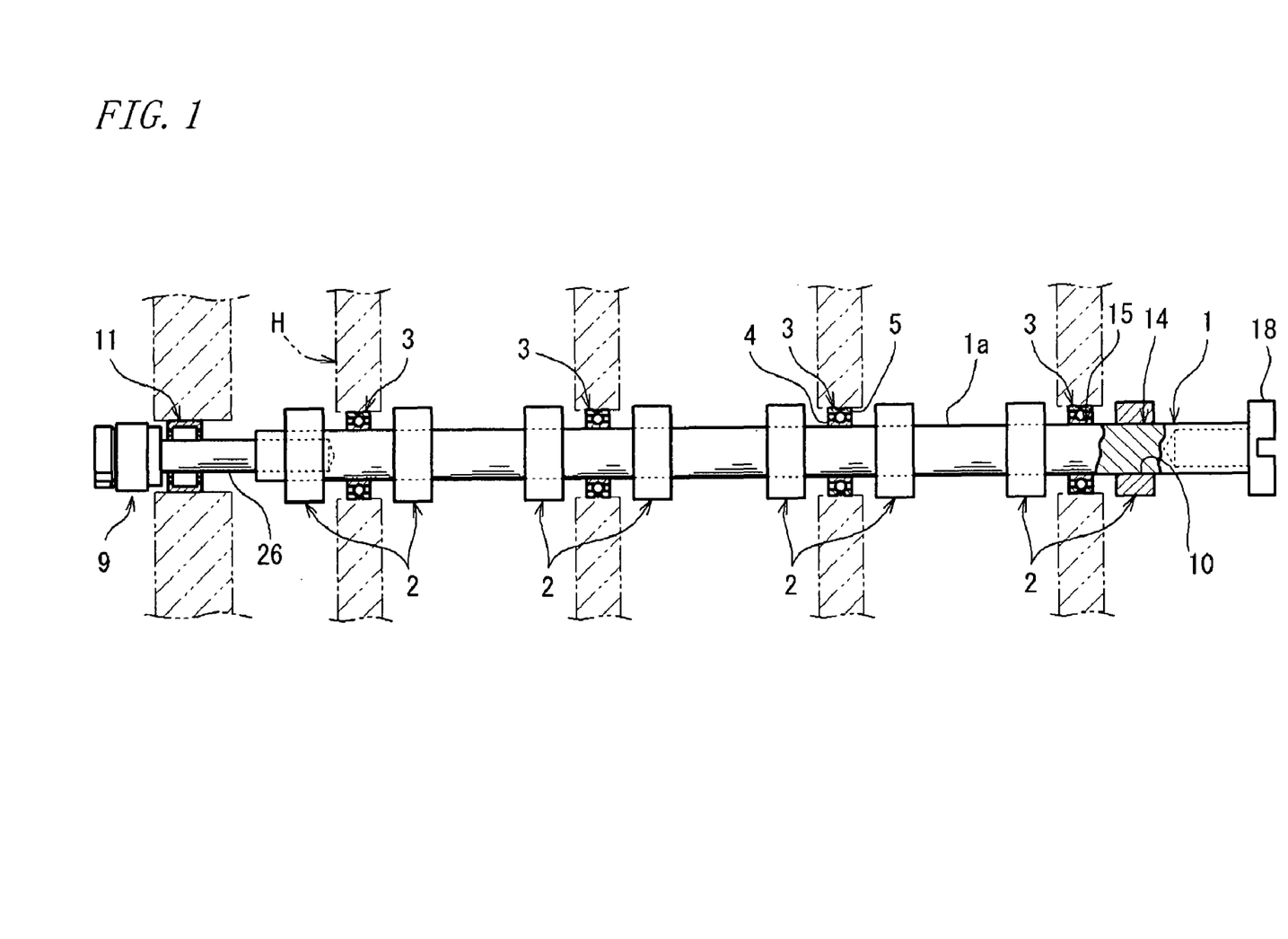
FIG. 1 is a partially-sectioned side view showing a cam shaft assembly according to a first embodiment of the invention.

The invention is described with reference to a cam shaft assembly allowing the rotation of a shaft 1 including cams 2, as shown in FIG. 1. This cam shaft assembly is used for operating intake/exhaust valves of an automotive engine.

Now, the description is made on the whole body of the cam shaft assembly. This cam shaft assembly is accommodated in a housing H (cylinder head) formed of an aluminum block. The assembly includes: a linear shaft 1; a plurality of oval cams 2 independent from the cam shaft 1 and fitted thereon; and a plurality of rolling bearings 3 rotatably supporting the shaft 1. The cams 2 and the rolling bearings 3 are mounted on the shaft 1 at predetermined positions with respect to an axial direction of the shaft 1. One rolling bearing 3 is disposed between paired cams 2.

Figure 2:
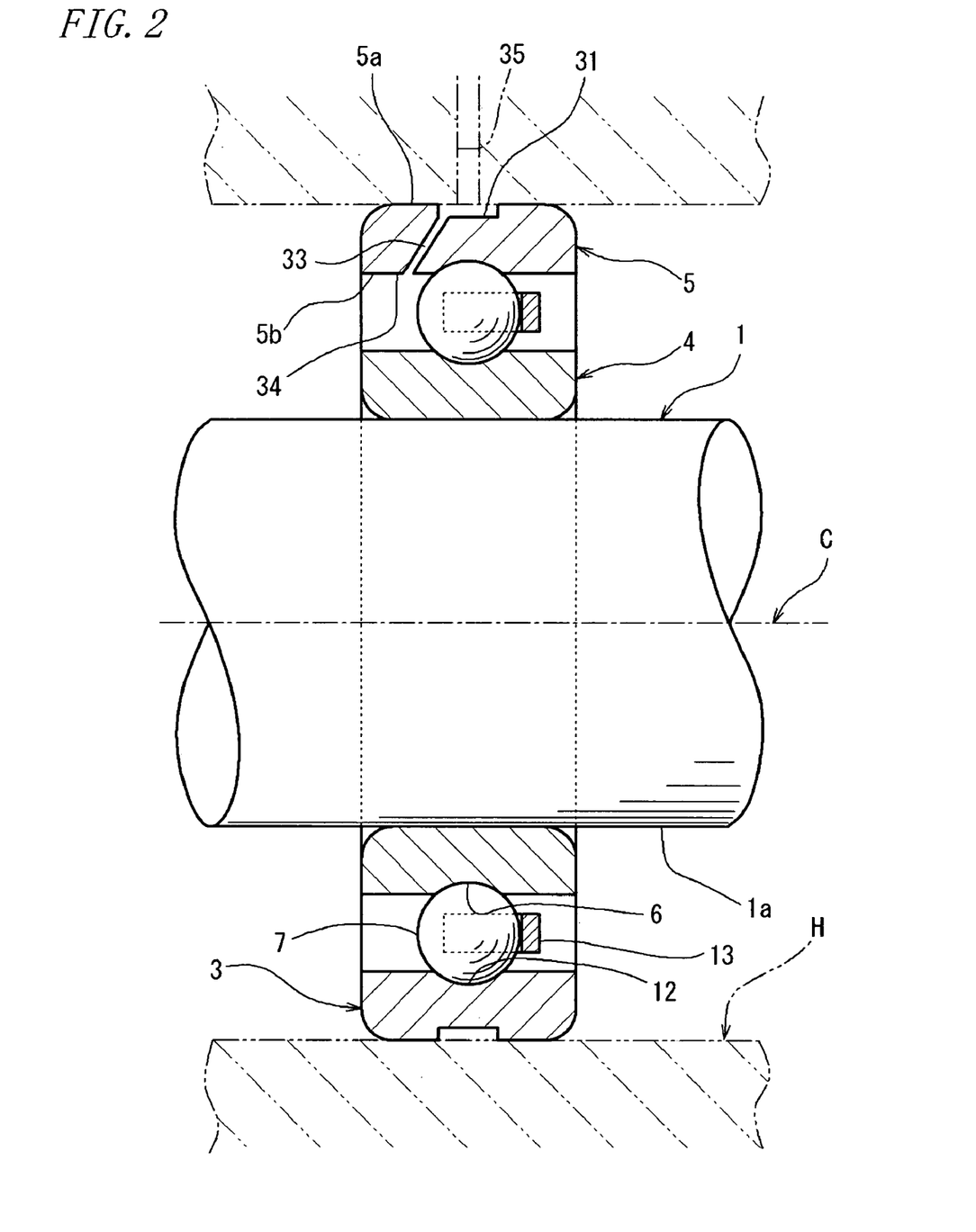
FIG. 2 is a sectional view showing a rolling bearing according to a first embodiment of the invention.

The rolling bearing 3 rotatably supports the shaft 1 as fitted on the shaft 1 and is constituted by a deep groove ball bearing. As shown in FIG. 2, the rolling bearing 3 includes: an inner ring 4; and an outer ring 5 disposed radially outwardly of the inner ring 4. A rolling element consisting of a plurality of balls 7 is interposed between a raceway (race groove) 6 of the inner ring 4 and a raceway (race groove) 12 of the outer ring 5. These balls 7 are retained by a cage 13.

The inner ring 4 is fixed to place as fitted on an outer periphery 1a of the shaft 1, whereas the outer ring 5 is fitted in an inside surface of the housing H, whereby the rolling bearing 3 is fixed to place.

Figure 8:
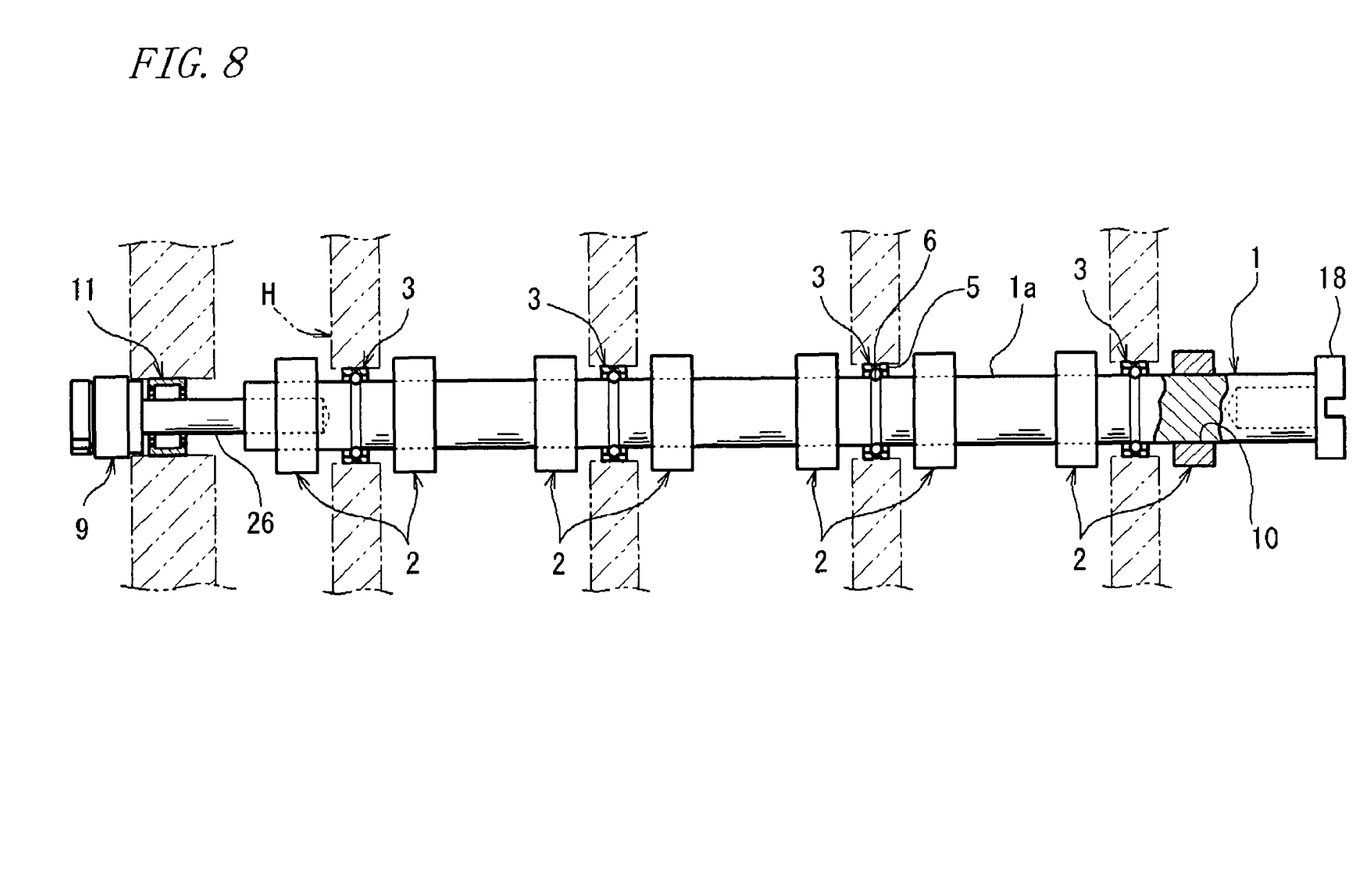
FIG. 8 is a partially-sectioned side view showing a cam shaft assembly according to a second embodiment of the invention.

FIG. 8 is a partially-sectioned side view showing a cam shaft assembly according to another embodiment. The rolling bearing 3 of this assembly is constituted such that the raceway 6 of the inner ring is defined by the outer periphery 1a of the cam shaft 1. Specifically, this assembly omits the inner ring 4 of the cam shaft assembly shown in FIG. 1, using the cam shaft 1 as the inner ring. This constitution is adapted not only to reduce the number of components but also to increase load carrying capacity.

FIG. 2 is a sectional view showing a rolling bearing 3 according to a first embodiment of the invention. The rolling bearing 3 includes a groove 31 (hereinafter, referred to as "circumferential groove 31") circumferentially formed on an outer periphery 5a of the outer ring 5, and an oil feeding hole 33 formed at place in the circumferential groove 31 and extending therefrom through the outer ring 5 to an inner periphery 5b of the outer ring 5. The circumferential groove 31 is a recessed groove which does not extend radially through the outer ring 5 but continues in the circumferential direction thereof.

The oil feeding hole 33 is so formed as to open on a surface portion of the inner periphery 5b of the outer ring 5, the surface portion located out of contact with the balls 7 as the rolling element. More specifically, the oil feeding hole 33 opens on the surface portion other than the raceway 12 of the inner periphery 5b of the outer ring 5, the raceway 12 formed in a predetermined curvature radius. Namely, the oil feeding hole 33 opens on a non-raceway surface 34 which is located axially sideway from the raceway 12 and is linearly extended in parallel to a center axis C. This prevents the oil feeding hole 33 from exerting influence on the rolling motion of the balls 7.

Although at least one oil feeding hole 33 need be formed, it is preferred to form plural oil feeding holes circumferentially equally spaced such as to feed oil to plural places at a time. The oil feeding hole 33 opens on place including a bottom of the circumferential groove 31 having a rectangular section. In FIG. 2, the oil feeding hole 33 opens on a corner formed between the bottom and a side surface of the circumferential groove 31. While a lubricant is prone to accumulate on the corner, this constitution is adapted to supply such a lubricant to the oil feeding hole 33, thus preventing the accumulation of the lubricant.

The circumferential groove 31 is formed axially centrally on the outer periphery 5a of the outer ring 5. The oil feeding hole 33 is formed in a straight line extending from the circumferential groove 31 toward an axially lateral side and in a radially inward direction. An alternative constitution, the illustration of which is omitted, may also be made such that the circumferential groove 31 is formed on an axial end portion (lateral end) of the outer periphery 5a, whereas the oil feeding hole 33 is formed in a straight line extending from this circumferential groove 31 toward the axial center (the axially central raceway 12) and in the radial inward direction.

According to this rolling bearing 3, the lubricant is fed into the circumferential groove 31 of the outer ring 5 of the rolling bearing 3 via a lubricant hole 35 formed in the housing H. Then, the lubricant is delivered to the non-raceway surface 34 of the inner periphery 5b of the outer ring 5 via the oil feeding hole 33. The lubricant so delivered to the non-raceway surface 34 flows along the inner periphery 5b of the outer ring 5 toward the raceway 12. Thus is accomplished oil feeding to the raceway 12.

Figure 3:
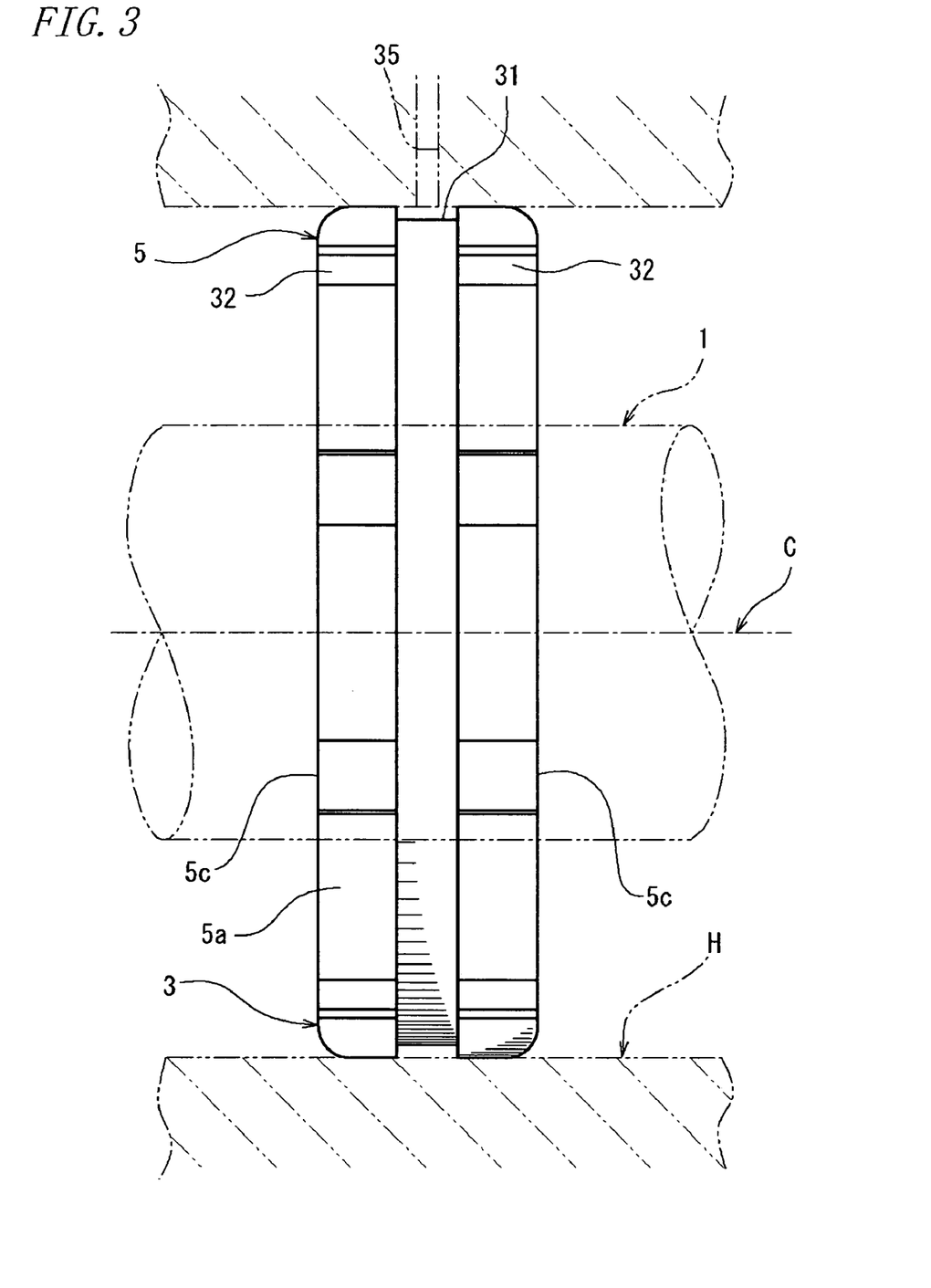
FIG. 3 is a side view showing a rolling bearing according to a second embodiment of the invention.

FIG. 3 is a side view showing a rolling bearing 3 according to a second embodiment of the invention. This rolling bearing 3 includes a groove 31 (hereinafter, referred to as "circumferential groove 31") circumferentially formed on the outer periphery 5a of the outer ring 5, and an axial groove 32 (hereinafter, referred to as "axial groove 32") extending from place in the circumferential groove 31 and opening on a lateral side 5c of the outer ring 5 on the outer periphery 5a of the outer ring 5. The circumferential groove 31 is a recessed groove which does not extend radially through the outer ring 5 but continues in the circumferential direction thereof. The circumferential groove 31 is formed axially centrally of the outer periphery 5a of the outer ring 5. Specifically, the circumferential groove 31 is formed on a phantom center line dividing the outer periphery 5a of the outer ring 5 into two axial portions and continuing in the circumferential direction thereof.

Figure 4:
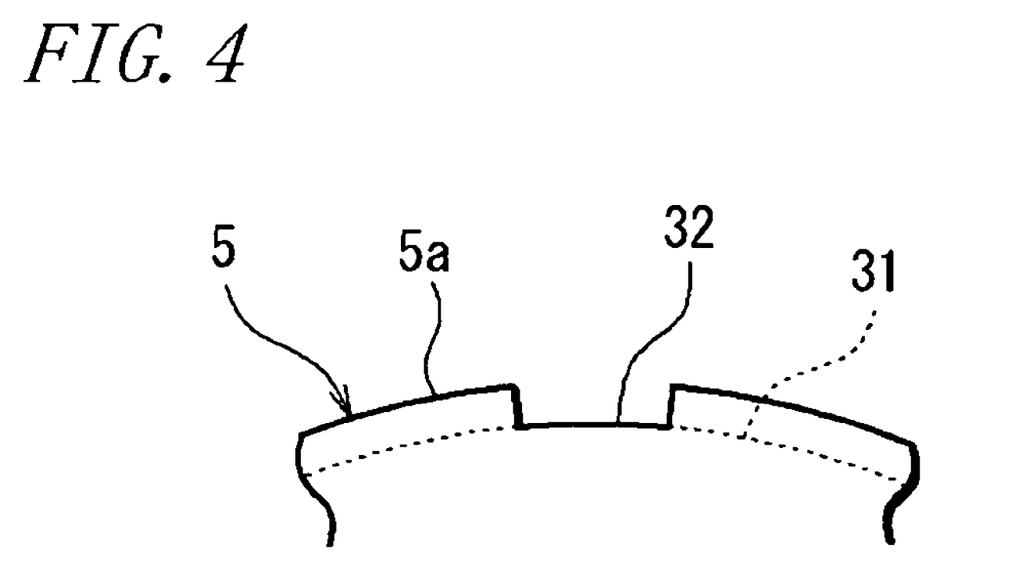
FIG. 4 is a partially-enlarged view of an outer peripheral edge of an outer ring as viewed axially.

The axial grooves 32 are formed to linearly extend through the outer ring 5 to the opposite lateral sides 5c thereof as transecting the circumferential groove 31. The individual axial grooves 32 are formed on the axially opposite sides (on the right-hand and left-hand sides) of the circumferential groove 31 and in juxtaposing relation. These axial grooves 32 on the opposite sides are formed to define an axially continued linear groove with the circumferential groove 31 interposed therebetween. Although at least one line of axial groove 32 need be formed with respect to the circumferential direction, it is preferred to form plural lines of circumferentially equally spaced axial grooves 32, as shown in FIG. 3. FIG. 4 is a view of an outer peripheral edge of the outer ring 5 as viewed axially. The axial groove 32 and the circumferential groove 31 are formed in the same depth. According to this embodiment, the right-hand and left-hand axial grooves 32 are formed symmetrically with respect to the circumferential groove 31 and hence, the lubricant may be uniformly fed from the axially opposite sides.

Figure 5:
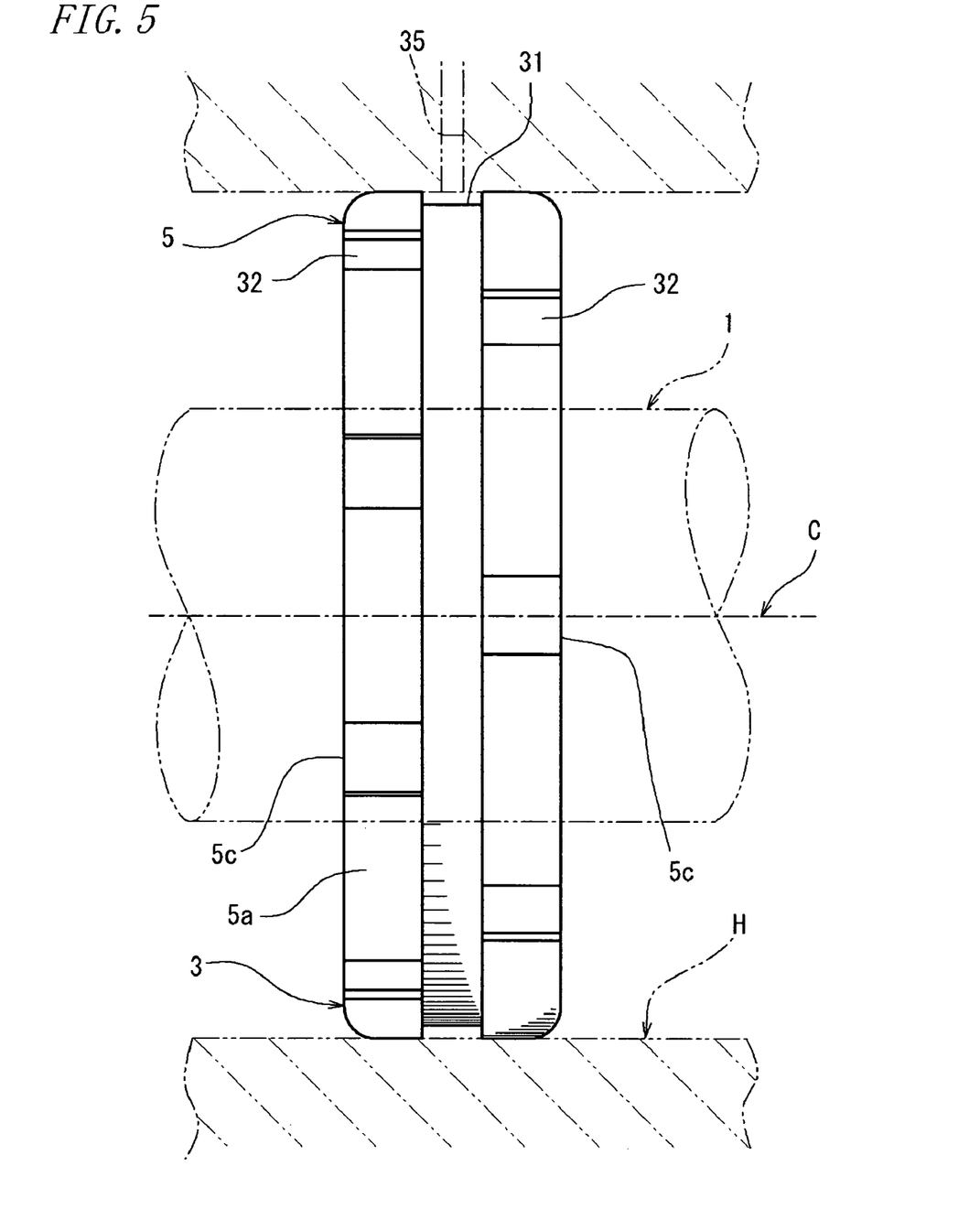
FIG. 5 is a side view showing a rolling bearing according to a third embodiment of the invention.

FIG. 5 is a side view showing a rolling bearing 3 according to a third embodiment of the invention. Similarly to the rolling bearing of the second embodiment, this rolling bearing 3 includes the circumferential groove 31 and the axial grooves 32 formed on the outer periphery 5a of the outer ring 5. The circumferential groove 31 is formed axially centrally of the outer periphery 5a of the outer ring 5.

The individual axial grooves 32 are formed on the axially opposite sides (on the right-hand and left-hand sides) of the circumferential groove 31. However, the right-hand and left-hand axial grooves 32 are circumferentially shifted from each other (varied in phase). Accordingly, these axial grooves 32 differ from those of the second embodiment (FIG. 3). These axial grooves 32 are not linearly extended through the outer ring 5 to the opposite lateral sides 5c thereof.

Although at least one line of axial groove 32 need be formed at place on each of the opposite sides of the circumferential groove 31, it is preferred to form plural lines of circumferentially equally spaced axial grooves 32, as shown in FIG. 5. The other parts are constituted the same way as in the second embodiment. The constitution of the third embodiment is effective in a case where the ease of flow of the lubricant differs between the right-hand and left-hand portions of the rolling bearing 3 because the opposite lateral sides of the rolling bearing 3 are subject to different geometries of the housing H and the like.

Figure 6:
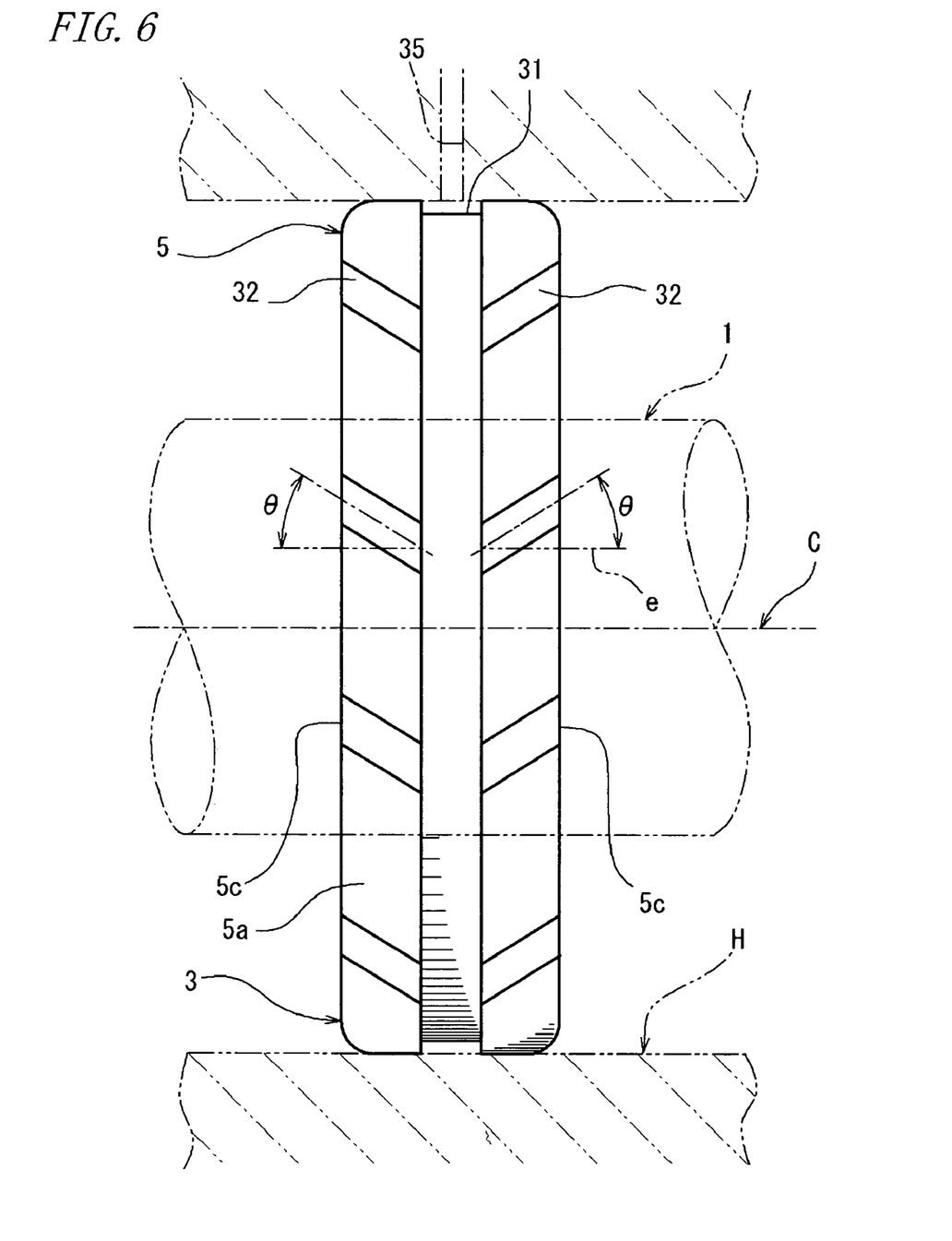
FIG. 6 is a side view showing a rolling bearing according to a fourth embodiment of the invention.
Figure 7:
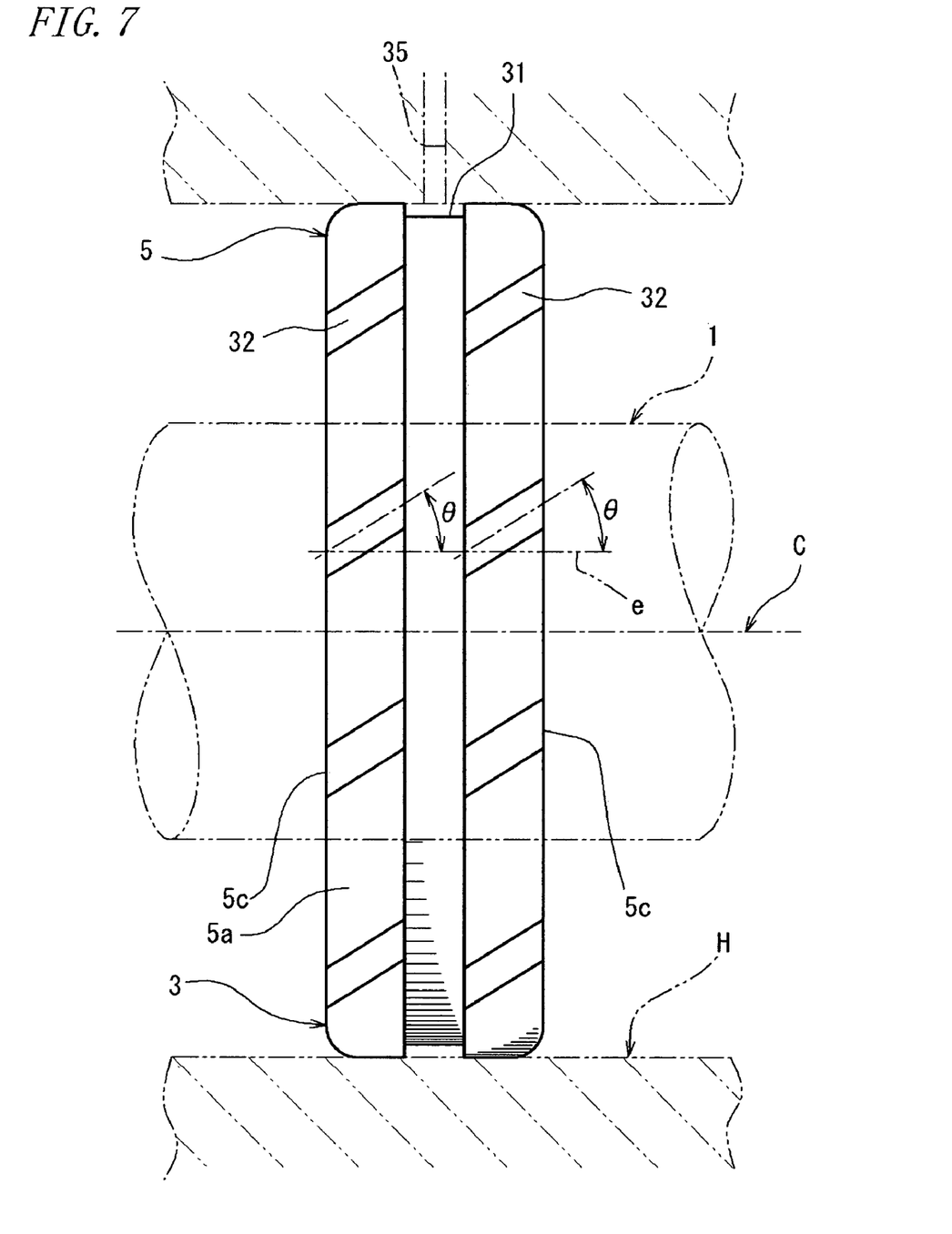
FIG. 7 is a side view showing a rolling bearing according to a fifth embodiment of the invention.

FIG. 6 is a side view showing a rolling bearing 3 according to a fourth embodiment of the invention. FIG. 7 is a side view showing a rolling bearing 3 according to a fifth embodiment of the invention. Similarly to the rolling bearing of the second embodiment, these rolling bearings 3 include the circumferential groove 31 and the axial grooves 32 formed on the outer periphery 5a of the outer ring 5. The circumferential groove 31 is formed axially centrally of the outer periphery 5a of the outer ring 5. The axial grooves 32 are formed on the outer periphery 5a of the outer ring 5 in a manner to incline at a predetermined angle θ relative to a straight line (hereinafter, referred to as "base line e") parallel to the center axis C of the rolling bearing 3.

In FIG. 6, the axial grooves 32 adjoining each other via the circumferential groove 31 are formed in directions to have their centerlines intersect each other. In FIG. 7, on the other hand, the axial grooves 32 adjoining each other via the circumferential groove 31 are formed to direct their centerlines parallel to each other. According to FIG. 6 and FIG. 7, the lubricant is allowed to move by gravity in the axial grooves 32 in a downward direction. Such axial grooves 32 formed in the direction to allow the lubricant to move toward the lateral sides 5c of the outer ring 5 exist on the outer periphery 5a, facilitating the movement of the lubricant fed into the circumferential groove 31 toward the lateral sides 5c of the outer ring 5.

While FIG. 6 and FIG. 7 show the right-hand and left-hand axial grooves 32 adjoining each other via the circumferential groove 31, the right-hand and left-hand axial grooves (not shown) may also be shifted from each other with respect to the circumferential direction. Alternatively, the axial grooves 32 inclined at different angles θ may be formed at plural places along the circumferential direction.

According to the rolling bearings 3 of the second to fifth embodiments, the lubricant is fed into the circumferential groove 31 via the hole 35 formed in the housing H and then, is delivered to the axially opposite lateral sides 5c of the outer ring 5 via the axial grooves 32. The lubricant so delivered to the lateral sides 5c of the outer ring 5 flows along the lateral sides 5c and the inner periphery 5b of the outer ring 5, so as to be fed to the raceway portion.

Each race of the rolling bearing 3 of each of the embodiments is not formed in a split structure but in an annular monolithic piece (one-piece structure). The inner ring 4 and the outer ring 5, shown in FIG. 1, consist of the annular monolithic piece, respectively. In FIG. 8, the outer ring 5 consists of the annular monolithic piece. Thus, seam formation on the raceway is obviated. This rolling bearing 3 is mounted to the shaft 1 at a predetermined axial position thereof (rolling-bearing mounting portion 15) by inserting an end of the shaft 1 through the rolling bearing 3, followed by axially moving the rolling bearing 3 along the shaft 1 to the predetermined axial position.

As shown in FIG. 1 or FIG. 8, the cam shaft assembly has an assembly structure wherein the shaft 1 and the cams 2 are each manufactured as separate parts and are assembled into the cam shaft. Specifically, the shaft 1 is a linear member, whereas the cam 2 is formed with a through-hole 10 to allow the cam 2 to be fitted on the shaft 1. This permits the cam 2, fitted on the shaft 1 by inserting the end of the shaft 1 therethrough, to be axially moved from the end of the shaft 1 along the shaft 1 and to be mounted to a predetermined axial position (cam mounting portion 14) of the shaft 1. The shaft 1, the cams 2 and the rolling bearings 3 may be constructed as a single cam shaft unit. That is, the shaft, the cams and the rolling bearings may be previously assembled into the unit, which may be assembled in the housing H.

A shaft member 26 is mounted to one end (left-hand end) of the shaft 1. The shaft member 26 is fixed to the shaft 1 in coaxial relation therewith. Mounted to the shaft member 26 are a pulley 9 for rotating the shaft 1, and a cylindrical-roller bearing 11 for supporting a shaft portion near the pulley 9. Although a great radial belt-load is exerted on the pulley 9, the cylindrical-roller bearing 11 having a great load carrying capacity is used so as to support the shaft member 26 and the shaft 1 in a stable manner. Similarly to the above, an outer ring of the cylindrical-roller bearing 11 is also formed with the oil feeding hole 33, the circumferential groove 31 and the axial grooves 32, the illustration of which is omitted.

The cam 2 mounted to this shaft 1 is described in more details. While the cam 2 may be constituted to rotate unitarily with the shaft 1 by using a key member or the like, it is preferred to fix the cam 2 to the shaft 1 by way of interference fit between the through-hole 10 of the cam 2 and the shaft 1. Therefore, the cam 2 may be mounted to the shaft 1 by way of shrinkage fit, for example. This provides for an easy and rigid mounting of the cam 2, and negates the need for an additional fixing member so as to reduce the number of components.

The shaft 1 is described in more details. The shaft 1 is formed in a linear structure which permits the cams 2 and the rolling bearings 3 to be individually moved from the end of the shaft 1 in the axial direction whereby the cams 2 and rolling bearings 3 are mounted to the predetermined positions. In order to permit the individual cams 2 and rolling bearings 3 to be axially moved to the predetermined positions, the shaft 1 is so constituted as to have the same outside diameter at the cam mounting portion 14 and the rolling-bearing mounting portion 15 and to define a circular section having the maximum outside diameter at these portions. In FIG. 8, the rolling-bearing mounting portion 15 is formed with the raceway 6 and hence, the outside diameter of the rolling-bearing mounting portion 15 is defined to be a diameter determined at a shoulder portion. This enables centerless processing (centerless grinding) of the cam mounting portion 14 and the rolling-bearing mounting portion 15 of the shaft 1, thus the shaft 1 of high precision may be produced easily and at low cost.

The shaft 1 may have a linear structure having a constant diameter across the overall length thereof, defining a uniform circular section with respect to the axial direction (namely, the outer periphery 1a of the shaft 1 is free from step across the overall length thereof). Alternatively, the shaft may also have a small-stepped linear structure wherein all the cam mounting portions 14 and rolling-bearing mounting portions 15, having the same outside diameter, define the maximum diameter while the other shaft portions define a slightly smaller diameter.

According to the constitution as described above, the lubricant may be effectively fed to the race portion of the bearing so that the cam shaft assembly equipped with the rolling bearings 3 having an excellent lubrication performance may be provided. Hence, the cam shaft unit including the shaft 1, the cams 2 and the rolling bearings 3 may be prevented from encountering oil shortage and is capable of working smoothly.

All the bearings supporting the shaft 1 are the rolling bearings 3 (the deep groove ball bearings and the cylindrical-roller bearing 11) and hence, the shaft assembly may be particularly reduced in the frictional resistance at the start of rotation and during low speed rotation. Thus, the shaft assembly as a whole may achieve a dramatic reduction of the friction loss during rotation. Therefore, the shaft assembly may be advantageously used as the cam shaft assembly for operating the intake/exhaust valves of the automotive engine, thereby contributing to an improved fuel economy of the engine.

The following working effect is offered by using the deep groove ball bearings as the rolling bearings 3 disposed in the vicinity of the cams 2 for supporting the shaft 1. The shaft 1 is provided with the plural cams 2. A load is exerted on these cams 2 operating the intake/exhaust valves of the engine, thus causing periodic pulsations (vibrations) of the shaft 1. However, the deep groove ball bearing is capable of relieving the displacement of the vibrated shaft 1 by way of the raceways defined by curved surfaces and the balls 7 in contact with the raceways. What is more, the rolling bearing 3 is capable of bearing an axial load exerted on the shaft 1, thus restricting an axial displacement of the shaft 1.

According to the invention as described above, the lubricant may be effectively supplied to the raceways of the rolling bearings without affecting the rolling motion of the rolling element.

The shaft assembly of the invention is not limited to the illustrated embodiments and may be practiced in any other mode within the scope of the invention. While FIG. 1 and FIG. 8 illustrate the eight cams 2 and the four rolling bearings 3, the arrangement and quantities of these components are not limited to this and may be varied arbitrarily.

Figure 9:
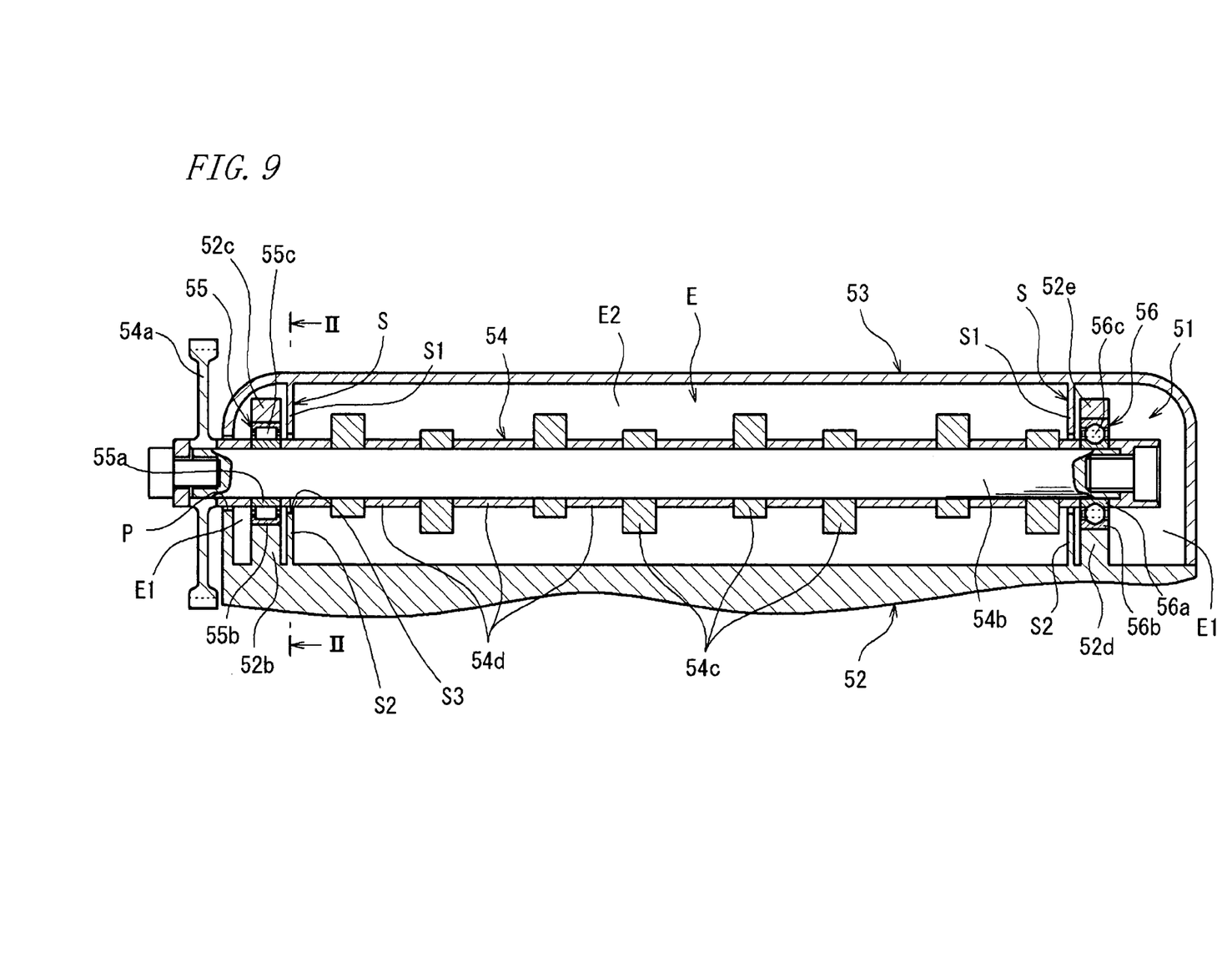
FIG. 9 is a sectional view showing an upper part of a 4-cycle engine incorporating therein a cam shaft supporting apparatus according to a first embodiment hereof.

Next, description is made on a cam shaft supporting apparatus of the invention. FIG. 9 is a sectional view showing an upper part of a 4-cycle engine incorporating therein a cam shaft supporting apparatus according to a first embodiment of the invention.

Referring to FIG. 9, a cam shaft supporting apparatus 51 is disposed in a valve operating chamber E enclosed by a cylinder head 52 constituting an upper part of the 4-cycle engine and a head cover 53 covering an upper part of the cylinder head 52. The cam shaft supporting apparatus 51 rotatably supports a cam shaft 54 for operatively opening/closing unillustrated intake/exhaust valves provided at the cylinder head.

The cam shaft 54 has one end thereof projected outwardly of the head cover 53 through a hole P intercommunicating the outside and the interior of the valve operating chamber E formed by the cylinder head 52 and the head cover 53. Mounted to a distal end of the outwardly projected portion is a synchronous pulley 54a for rotating the cam shaft 54 in synchronism with a crank shaft not shown. The cam shaft 54 includes: a shaft body 54b; a plurality of cams 54c for operating a valve operating mechanism operative to open/close the unillustrated intake/exhaust valves; and a plurality of cylindrical spacers 54d for positioning these cams 54c at axial space intervals. This cam shaft 54 is constructed by press-fitting the cams 54c and the spacers 54d on the shaft body 54b according to a predetermined arrangement.

The cam shaft supporting apparatus 51 includes: a first rolling bearing 55 mounted to a first end of the cam shaft 54 to which the pulley 54a is mounted; a second rolling bearing 56 mounted to a second end of the cam shaft 54; shielding plates S partitioning the interior of the valve operating chamber E thereby defining bearing chambers E1 in the valve operating chamber E, the bearing chambers E1 provided with the first and second rolling bearings, respectively. The first and second rolling bearings 55, 56 are disposed on the opposite ends of the cam shaft 54 for rotatably supporting the cam shaft 54 relative to the cylinder head 52.

The first rolling bearing 55 includes: an inner ring 55a; an outer ring 55b; and a plurality of cylindrical rollers 55c interposed between these inner and outer rings, and constitutes a grease sealed cylindrical-roller bearing wherein a grease is sealed in space between the inner and outer rings 55a, 55b with a seal. The shaft body 54b of the cam shaft 54 is press-inserted in an inner periphery of the inner ring 55a of the first rolling bearing 55. The first rolling bearing 55 is positioned at a predetermined position on the first end of the cam shaft 54 by means of the spacer 54d. The first rolling bearing 55 has an outer periphery of the outer ring 55b clamped between a bracket 52b formed at the cylinder head 52 and a cap 52c so as to be fixed to the cylinder head 52.

The second rolling bearing 56 includes: an inner ring 56a; an outer ring 56b; and a plurality of balls 56c interposed between the inner and outer rings and constitutes a grease sealed ball bearing wherein a grease is sealed in space between the inner and outer rings 56a, 56b with a seal. The shaft body 54b of the cam shaft 54 is press-inserted in an inner periphery of the inner ring 56a of the second rolling bearing 56. The second rolling bearing 56 is positioned at a predetermined position on the second end of the cam shaft 54 by means of the spacer 54d. The second rolling bearing 56 has an outer periphery thereof clamped between a bracket 52d formed at the cylinder head 52 and a cap 52e so as to be fixed to the cylinder head 52.

The embodiment uses the ball bearing as the second rolling bearing 56 such that an axial load exerted on the cam shaft 54 during engine operation may be borne by means of the second rolling bearing 56.

According to the embodiment, the cam shaft 54 is supported only at the opposite ends thereof by means of the first and second rolling bearings 55, 56. Therefore, the cylinder head 52 and the like disposed around the cam shaft 54 may have more simplified constitutions as compared with a case where a greater number of bearings are used for supporting the cam shaft 54, for example. As compared with the case where a greater number of bearings are used for supporting the cam shaft 54, in addition, the rotary torque of the bearings is decreased. This is advantageous for reducing the torque of the cam shaft 54.

Figure 10:
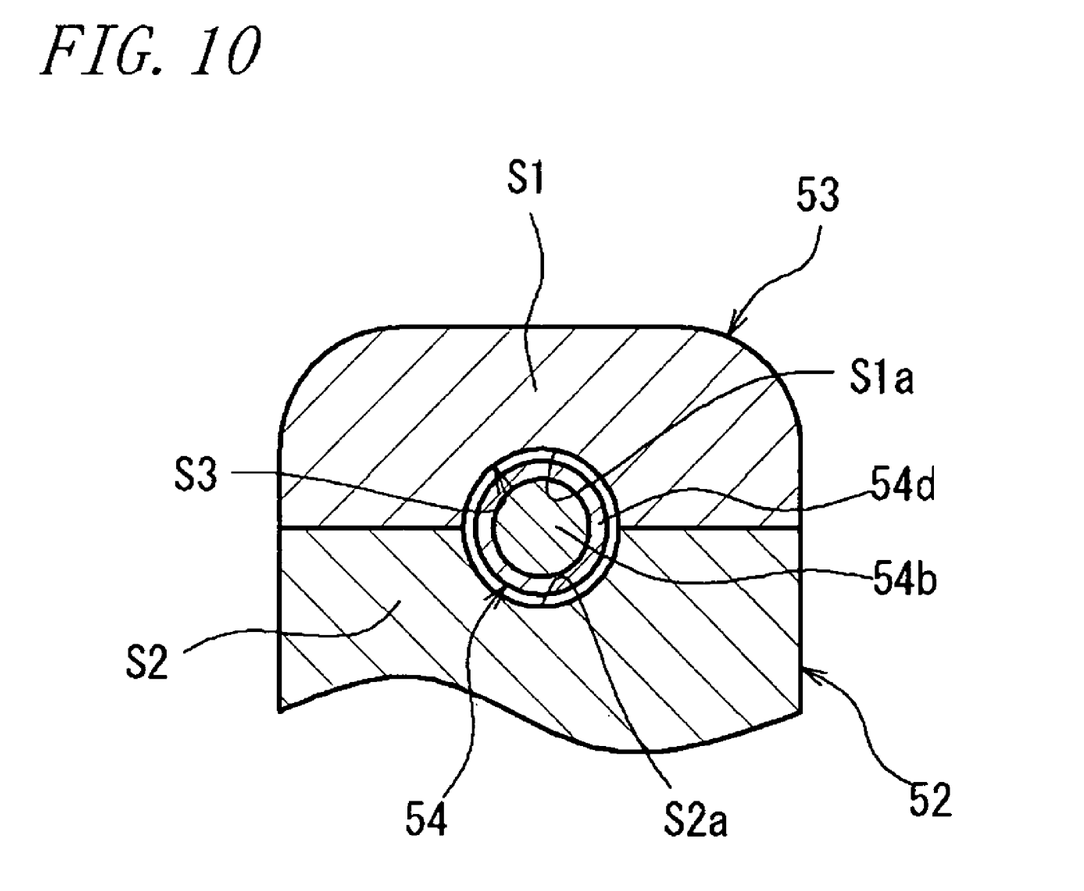
FIG. 10 is a sectional view taken on the line II-II in FIG. 9.

The shielding plate S includes: an upper shielding plate S1 formed internally of the head cover 53; and a lower shielding plate S2 formed on the cylinder head 52. FIG. 10 is a sectional view taken on the line II-II in FIG. 9. As shown in the figure, the upper and lower shielding plates S1, S2 are designed such that end faces of the upper and lower shielding plates S1, S2 are aligned with each other when the head cover 53 is mounted to cylinder head 52 in order to cover a top surface of the cylinder head 52. Further, the upper and lower shielding plates S1, S2 are formed with semicircular notches S1a, S2a, respectively. These notches S1a, S2a are so designed as to combined with each other to form a hole S3 when the end faces of the upper and lower shielding plates S1, S2 are aligned with each other, the hole S3 insertedly penetrated by the cam shaft 54. The hole S3 has a diameter relative to an outside diameter of the cam shaft 54 such that a clearance therebetween is formed to be too small to allow an easy passage of the engine lubricant therethrough.

Returning to FIG. 9, these shielding plates S partition the longitudinally opposite end portions of space in the valve operating chamber E, thereby defining bearing chambers E1 and a cam chamber E2 in the valve operating chamber E, the bearing chambers E1 wherein the first and second bearings 55, 56 are disposed, the cam chamber E2 wherein the cam 54C and the unillustrated valve operating mechanism is disposed. A constitution is made such that the engine lubricant may be fed into the cam chamber E2 for lubricating the cam 54c and the unillustrated valve operating mechanism. On the other hand, the bearing chamber E1 is constituted such that the shielding plate S does not permit the engine lubricant to invade into the chamber easily. This ensures that the first and second rolling bearings 55, 56 are kept out of the engine lubricant in the cam chamber E2. Namely, the engine lubricant is prevented from invading into the first and second rolling bearings 55, 56. That is, the shielding plate S constitutes shielding means for preventing the engine lubricant from invading into the first and second rolling bearings 55, 56.

The cam shaft supporting apparatus 51 according to the embodiment constituted as described above includes the shielding plate S for shielding the engine lubricant in the valve operating chamber E against the first and second rolling bearings 55, 56. Hence, the apparatus is capable of preventing the engine lubricant from invading into the first and second rolling bearings 55, 56. Therefore, foreign substances such as carbon sludge and metal particles contained in the engine lubricant may be prevented from invading into the first and second rolling bearings 55, 56. In addition, the first and second rolling bearings 55, 56 are assuredly lubricated with the grease sealed therein. Even if the first and second rolling bearings 55, 56 are used for supporting the cam shaft 54 in order to reduce the torque of the cam shaft supporting apparatus 51, these rolling bearings 55, 56 may be prevented from producing the vibrations and noises, which are attributable to the aforesaid foreign substances, and from suffering the decreased service life.

According to the embodiment, the cylinder head 52 and the head cover 53 are provided with the shielding plates S. This negates the need for particularly assembling an additional member for shielding the engine lubricant and provides for easy shielding of the first and second rolling bearings 55, 56 against the engine lubricant.

According to the embodiment, the cam shaft 54 is supported only at the opposite ends thereof by means of the first and second rolling bearings 55, 56. However, in a case where a relatively long cam shaft for multicylinder engine is supported, a sliding bearing may be interposed between the plural cams 54c, as needed.

Figure 11:
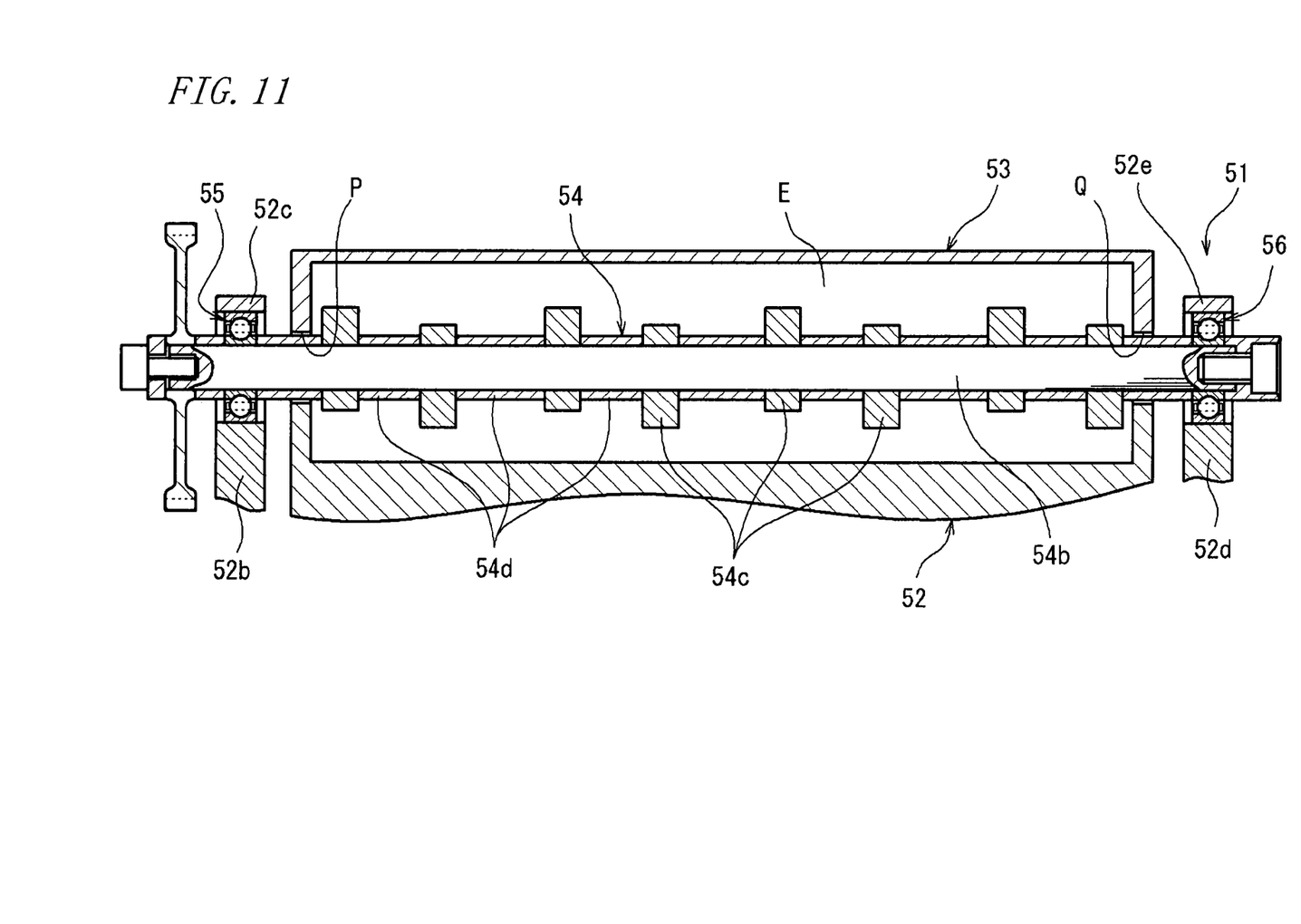
FIG. 11 is a sectional view showing an upper part of a 4-cycle engine incorporating therein a cam shaft supporting apparatus according to a second embodiment of the invention.

FIG. 11 is a sectional view showing an upper part of a 4-cycle engine incorporating therein the cam shaft supporting apparatus according to a second embodiment hereof. This embodiment principally differs from the first embodiment in that the first and second rolling bearings 55, 56 are disposed externally of the valve operating chamber E and support the opposite ends of the cam shaft 54 extended through the valve operating chamber E and projecting the opposite ends thereof from the cylinder head 52 and the head cover 53; that the cylinder head 52 and the head cover 53 are not formed with the shielding plates S; and that the ball bearing is used as the first rolling bearing 55. The other parts are the same as those of the first embodiment and hence, the description thereof is dispensed with.

In FIG. 11, the cylinder head 52 and the head cover 53 is formed with holes P, Q at lateral sides thereof with respect to a longitudinal direction of the engine, the holes P, Q intercommunicating the outside and the interior of the valve operating chamber E. The cam shaft 54 extends through these holes P, Q whereby the cam shaft 54 is disposed in the valve operating chamber E as projecting the opposite ends thereof from the cylinder head 52 and the head cover 53.

The first and second rolling bearings 55, 56 supporting the cam shaft 54 have the respective outer peripheries thereof clamped between the brackets 52b, 52d formed externally of the valve operating chamber E of the cylinder head 52 and the caps 52c, 52e, whereby the rolling bearings 55, 56 are fixed to the cylinder head 52.

According to the cam shaft supporting apparatus 51 of the embodiment constituted as described above, the first and second rolling bearings 55, 56 do not suffer the invasion of the engine lubricant because the first and second rolling bearings 55, 56 are disposed externally of the valve operating chamber E. Thus, the foreign substances contained in the engine lubricant are prevented from invading into the rolling bearings 55, 56. Therefore, the first and second rolling bearings 55, 56 may be prevented from producing the vibrations and noises, which are attributable to the aforesaid foreign substances, and from suffering the decreased service life.

According to the embodiment, the first and second rolling bearings 55, 56 are disposed externally of the engine and hence, the ambient temperatures of these rolling bearings 55, 56 may be lowered as compared with the case where the bearings are disposed in the valve operating chamber E. Accordingly, the bearings 55, 56 permit a grease having lower viscosity to be sealed therein so that the rotary torque of the cam shaft 54 maybe decreased further. Because of the lowered ambient temperatures of these rolling bearings 55, 56, these rolling bearings 55, 56 may have higher degrees of freedom in choice of seal material and grease sealing mode.

While this embodiment employs the ball bearings as the first and second rolling bearings 55, 56, only either one of these bearings may be the ball bearing as suggested by the first embodiment. In this case, the axial load exerted on the cam shaft 54 during engine operation may be borne by means of the ball bearing. Although the embodiment is constituted to support the cam shaft 54 only at the opposite ends thereof, the sliding bearing or the like may be provided between the plural cams 54c as needed in a case where a relatively long cam shaft for multicylinder engine is supported.

It is noted that the invention is not limited to the foregoing embodiments. According to the first embodiment, for instance, the cylinder head 52 and the head cover 53 are formed with the shielding plates S in order to provide the bearing chambers E1 on the opposite end portions of the valve operating chamber E. However, the shielding plate S may be constituted by an independent member. Alternatively, the whole body of the rolling bearing may be enclosed in a box member such as to shield the rolling bearing against the lubricant. In a case where the rolling bearing disposed in the vicinity of the center of the cam shaft 54 is shielded, for example, the shielding plates S may be disposed on the opposite sides of this rolling bearing to form the bearing chamber.

While the above embodiment uses the cam shaft 54 having an assembly structure wherein the cams 54c, the shaft body 54b and the spacers 54d are assembled, a cam shaft unitizing the cams and the shaft is also usable. While the rolling bearings each including the inner and outer rings are used as the first and second rolling bearings for supporting the cam shaft 54, a rolling bearing having a raceway defined by the outer periphery of the cam shaft 54 so as to omit the inner ring may also be used.

According to the cam shaft supporting apparatus of the invention as described above, if the rolling bearings are used for the purpose of torque reduction, the foreign substances contained in the engine lubricant may be prevented from invading into the rolling bearings. Therefore, the rolling bearing may be prevented from producing the vibrations and noises, and from suffering the shortened service life.

What is claimed is:

1. A rolling bearing comprising:
   a circumferential groove formed on an outer periphery of an outer ring; and
   an axial groove formed on the outer periphery of the outer ring and extended from place in the circumferential groove and opening on a lateral side of the outer ring,
   wherein the axial groove is formed on the outer periphery of the outer ring in a manner to incline relative to a straight line parallel to a center axis of the outer periphery of the outer ring.

2. A cam shaft supporting apparatus comprising:
   a plurality of rolling bearings disposed in a valve operating chamber enclosed by a cylinder head and a head cover of an engine, rotatably supporting a cam shaft relative to the cylinder head, and having a grease sealed therein; and
   shielding means for shielding the plural rolling bearings against an invading engine lubricant,
   wherein the shielding means include shielding plates formed leastwise at one of the cylinder head and the head cover, and partitioning the valve operating chamber thereby shielding against the invading engine lubricant and defining bearing chambers in the valve operating chamber, the bearing chambers in which the plural bearings are disposed.

3. A cam shaft supporting apparatus according to claim 2, wherein the plural rolling bearings support only the opposite ends of the cam shaft.

4. A cam shaft supporting apparatus according to claim 2, wherein at least one of the plural rolling bearing is a ball bearing.

* * * * *